United States Patent [19]

Wheeldon et al.

[11] Patent Number: 4,505,383
[45] Date of Patent: Mar. 19, 1985

[54] EDGE GUARD MEANS FOR A LINK BELT AND A LINK BELT EMBODYING SUCH MEANS

[75] Inventors: John B. Wheeldon, Fowey; John Jeffery; Paul F. Myerscough, both of Blackburn, all of England

[73] Assignee: Scapa-Porritt Limited, Blackburn, England

[21] Appl. No.: 328,637

[22] Filed: Dec. 8, 1981

[30] Foreign Application Priority Data

Dec. 9, 1980 [GB] United Kingdom ............... 8039369

[51] Int. Cl.³ ............................................. B65G 17/38
[52] U.S. Cl. ................................. 198/853; 198/837; 198/848
[58] Field of Search ............... 198/848, 849, 851, 853, 198/837, 840, 844, 850, 841; 474/239, 242, 244; 267/94, 169, 86, 84, 81, 105

[56] References Cited

U.S. PATENT DOCUMENTS

| | | | |
|---|---|---|---|
| 1,938,293 | 12/1933 | Korb | 198/849 |
| 2,214,739 | 9/1940 | Guba | 198/848 |
| 2,716,310 | 8/1955 | Moore | 198/844 |
| 2,740,615 | 4/1956 | Scholl | 198/844 |

FOREIGN PATENT DOCUMENTS 34140 2/1965 Finland ........................... 198/844

Primary Examiner—Joseph E. Valenza
Assistant Examiner—Jonathan D. Holmes
Attorney, Agent, or Firm—Fleit, Jacobson, Cohn & Price

[57] ABSTRACT

In order to protect the longitudinal edges of a link belt against damage or undue wear it is proposed to provide an edge guard comprising a multiplicity of guard elements engaged with the coils of the belt, the elements each comprising a body part for disposition adjacent the edge of the belt and a mounting element for engagement with a respective coil. The body part is preferably flexible, and the body parts of adjacent elements may partially overlie one another in providing a reinforcing wear resistant edge to the belt for protecting the ends of the coils.

24 Claims, 7 Drawing Figures

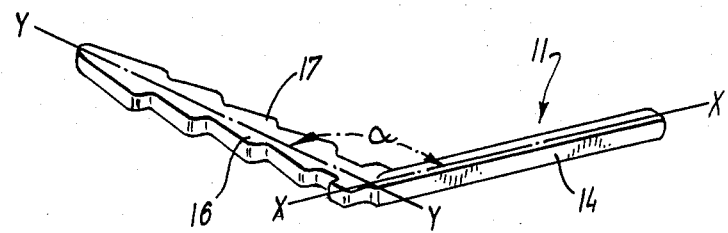
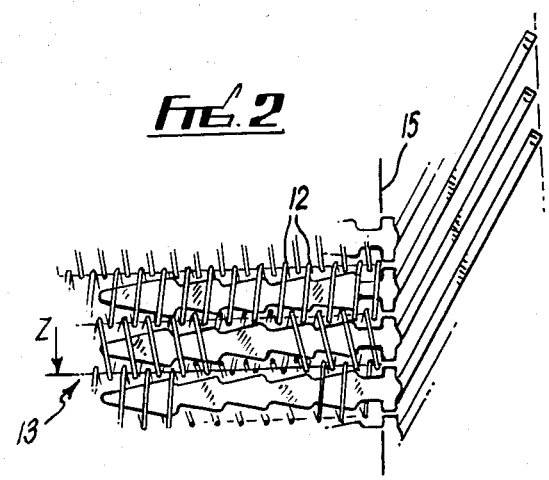
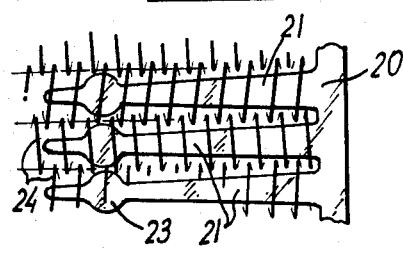
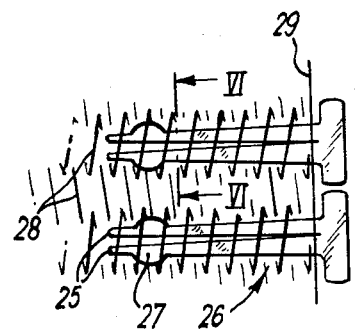

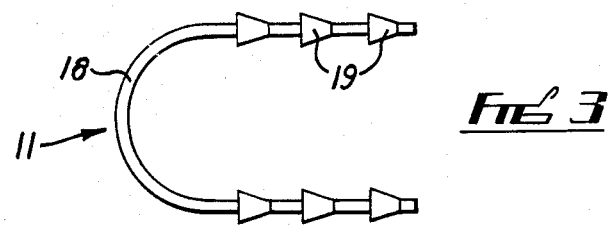
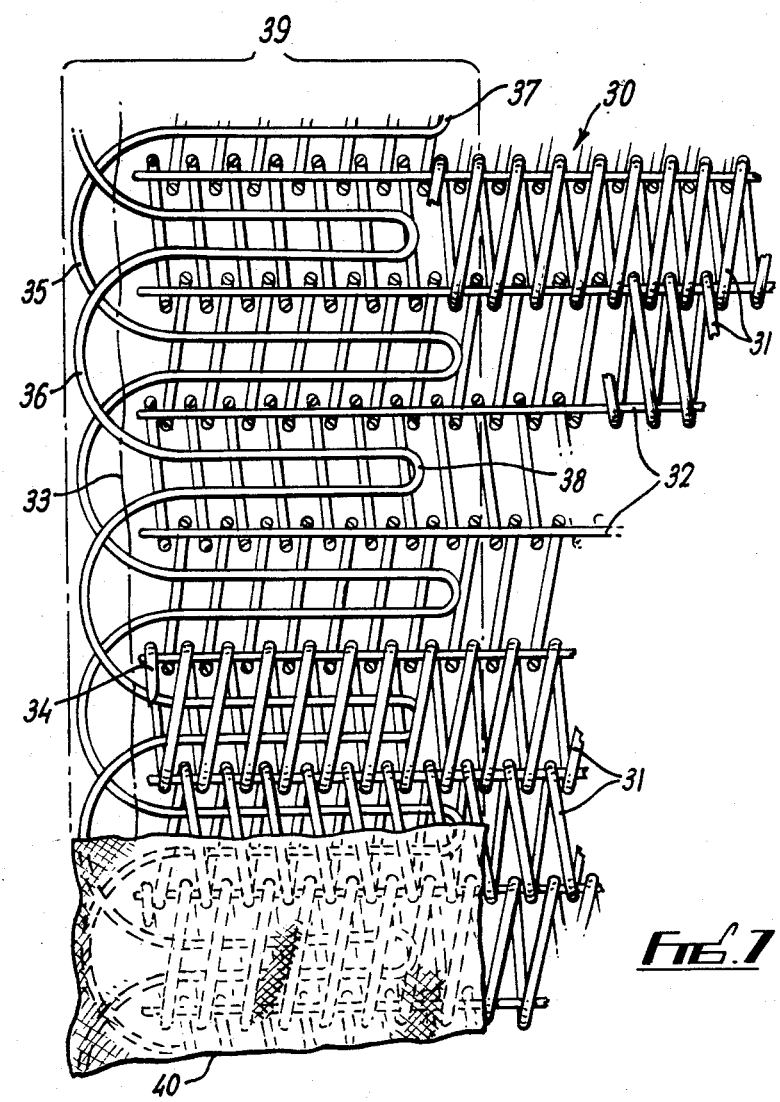

EDGE GUARD MEANS FOR A LINK BELT AND A LINK BELT EMBODYING SUCH MEANS

This invention relates to link belts of the kind comprising a multiplicity of helical coils of a polymeric material arranged in adjacent interdigitated disposition, and has more particular reference to an edge guard means for such belt. Link belts of the kind here involved provide moving support surfaces for use in a variety of contexts, typical uses being as conveyor belts or as clothing for papermaking and like machinery.

In use, the link belts are guided over rollers by guides located adjacent the edges of the belt. Contact with such edge guides gives rise to wear of the belt edges, and in some circumstances, for example as a result of a guiding error which causes the edges of the belt to come into contact with parts of the machine of which the belt forms a part or simply due to constant rubbing of the edges of the belt against a guide spade or arm which is used to sense the position of the belt and subsequently control the guidance thereof, the wear may be appreciable. The structure of the belts, and the disposition of the coils in the transverse or weft-direction of the belt, facilitates the spread of damage from the edges into the body of the belt fabric by a process of unwinding of the coils. This leads to premature belt failure.

It is an object of the present invention to provide a guard means for a link belt of the aforementioned type but with which the incidence of edge wear or damage to the edges of the belt is substantially reduced in comparison with belts used heretofore, thus prolonging the life of a belt.

The invention provides an edge guard means for application to a link belt defined by a multiplicity of helical coils arranged in interdigitated side-by-side relationship, the said guard means comprising a body part intended for location adjacent an edge of the link belt at a position outwardly thereof and mounting means axially engageable with a coil for supporting the body part in a requisite disposition relative to the said edge to protect the same against wear and/or damage.

The invention also includes a link belt comprising a multiplicity of helical coils arranged in interdigitated disposition, the edges of the belt being defined by respective substantially aligned ends of said multiplicity of helical coils, characterised by edge guard means engaged with selected ones of the said coils to extend outwardly therefrom and at least partially overlie the ends, thereby to protect the said edge against wear.

According to a preferred feature of the invention the edge guard means comprises a multiplicity of individual insert members engaged with selected ones of the said coils.

According to a further preferred feature the edge guard means extends into the coils a predetermined distance to define a border region of the belt and the border region may be impregnated with a settable material so as to retain the guard means in the coils. The settable material is preferably a resin, for example an elastomeric resin, which provides the required retention of the guard means within the coils without detracting from the flexibility of the belt. Additionally, or alternatively, retention of the edge guard means may be augmented by sewing through the belt.

The invention will now be described further with reference to the accompanying drawings in which:

FIG. 1 is a perspective view of a presently preferred form of edge guard means element;

FIG. 2 is a plan view, partly in section, of the edge guard means of FIG. 1 in position relative to a link belt structure;

FIG. 3 is an elevation of an alternative edge guard means element to that shown in FIG. 1;

FIG. 4 is a view corresponding to FIG. 2 of a further edge guard means element as applied to a link belt structure;

FIG. 5 is a view corresponding to FIGS. 2 and 4, and shows a further form of the invention as embodied in a link belt;

FIG. 6 is a section on line V1—V1 of FIG. 5; and

FIG. 7 is a plan view, partly in section, of a still further form of edge guard means as applied to a link belt.

Referring now to FIGS. 1 and 2, an edge guard means element 11 for cooperation with a respective helical coil 12 of a link belt 13 defined by a multiplicity of such coils in interdigitated side-by-side disposition comprises an elongate body part 14 for location along the edge face 15 of the link belt and a mounting means 16 formed integrally with the body part 14 and intended for axial engagement with the related coil 12 for supporting the element 11 in its intended position.

The edge guard means element 11 is conveniently of moulded construction, the preferred materials of choice being a synthetic plastics material or a natural or synthetic rubber, thereby to allow of a flexibility characteristic in the elongate body part 14.

Although the dimensions of the element will be determined by the dimensions of the link belt to which such element is to be applied, the body part 14 is typically 25 mm long and 2.5 mm wide, whilst the mounting means 16 is of a like length but has a width of 3.5 mm. The body part 14 and mounting means 16 are joined in substantially end-to-end disposition, and are so disposed as to define an included angle $\alpha$ in excess of 90° and preferably of approximately 120°. Although, in the embodiment illustrated the body part and mounting means comprise an integrally moulded structure wherein the inclination therebetween is varied by flexing of the body part, the individual parts may be separate integers hingedly connected together. Alternatively, the body part and mounting means may be connected together by a thin web or membrane, the element being of unitary moulded form.

The mounting means 16 is of barbed configuration as can be seen in FIG. 1, the thickness of such mounting means being approximately 2 mm., the body part 14, in order to provide for a requisite level of flexibility, being of lesser thickness. It is to be appreciated that the respective planes of the body part 14 and mounting means 16 are mutually perpendicular, although the longitudinal axes X—X, Y—Y of such body part and mounting means respectively; whilst lying in a common plane, define the included angle $\alpha$ aforesaid.

In use, a respective one of the elements as shown in FIG. 1 is axially engaged with each end of each of the helical coils 12 which collectively make up the link belt 13, the respective body parts 14 of the individual elements 11 being positioned in trailing relationship to the related mounting means having regard to the direction of intended motion Z of the belt.

As is readily apparent from FIG. 2 of the drawings, the body part 14 of adjacent edge guard means elements 11 are arranged in overlapping disposition, and collectively provide a protective cushion effect between the related belt edge 15 and any guide means (not shown) with which such edge would normally come into contact.

By suitable dimensioning of the mounting means 16, and particularly its transverse cross-section, in relation to the dimensions of the tunnel formed within a given coil by the bore of that coil and the flanks of the adjacent coils arranged in interdigitated relationship thereto, the requisite disposition of the body part 14 relative to the edge 15 of the link belt 13 can be maintained, and thus the guard element 11 fulfills its intended protection function during usage of the link belt.

The barbs 17 on the mounting means 16 serve to hold the element 11 against inadvertent withdrawal from the coil 12 by co-operation with the surface profile internally of that coil. However, it may be found convenient, further to safeguard against inadvertent withdrawal, to impregnate the edge region of the belt with a settable resin, not shown, for example an elastomeric resin substance, and/or by employing some mechanical means, as by sewing, to hold the edge guard means in position.

In an alternative arrangement, see now FIG. 3, the edge guard means element 11 takes the form of a loop 18 formed as a U-shaped length of strand material having protrusions 19 on its ends. Such loops 18 may be inserted into the coils 12 of a link belt so that the protrusions 19 engage the coils 12 and inhibit removal of the loops 18 therefrom. The loops 18 may be so dimensioned as to extend between adjacent, alternate or every third or more coils of the belt as desired, and those portions thereof which engage the coil ends may be of such cross-section or dimensions as to give an overlapping effect at the belt edge of a number of loops with, if desired, a plurality of loops engaged with a given coil.

In a development of the loop shown in FIG. 3 an edge guard element is also proposed, see FIG. 4, wherein a single body part 20 has a multiplicity of coil engaging limbs 21 extending therefrom, the said limbs 21 being barbed or otherwise, as at 23, to facilitate retention within those respective coils 24 with which the same are engaged, if desired.

As an alternative to the element as shown in FIGS. 1 and 2, and wherein the body part is shown to be of elongate form joined in trailing relationship to a mounting means, it may be found convenient, in some instances, simply to utilise an element in the form of a split pin having an enlarged head thereto, a typical such element being shown in FIGS. 5 and 6. The individual limbs 25 of the pin 26 may include profiled protuberance 27 of, say, corrugated form for co-operation with the internal profile of the tunnel in the coil 28 with which the same are engaged, or reliance may be placed on resin or mechanical securing of the aforesaid kind in maintaining the pin 26 in position relative to the belt edge 29. In the event that the protuberance 27 of the pin 26 is enlarged in the running direction of the belt, then the said limbs 25 will be such as angularly to locate the element 26 relative to the coil 28 by reference to the non-circular cross-section of the tunnel engaged by the two limbs of the element. If desired, the double-limb configuration of the element shown in FIGS. 5 and 6 may be replaced by a single limb.

A still further embodiment is shown in FIG. 7, the link belt 30 comprising a plurality of helical coils 31 arranged in adjacent interdigitated disposition and maintained in such disposition by means of hinge pins 32.

The coils 31 extend transversely of the belt 30 so that the edge 33 of the belt is defined by the ends 34 of the coils 31. In accordance with this further embodiment of the invention, extending between the ends 34 of the coils 31 are a plurality of loops 35, 36 which serve to protect the ends 34 from wear and from being unravelled in the event of contact of the ends with a guide or other part of a machine (not shown) adjacent which the belt 30 in use is caused to run.

The loops 35, 36 are formed from respective continuous strands 37, 38 which extend into each coil a predetermined distance so as to define a border region 39 of the belt 30.

As shown, each loop 35 of continuous strand 37 extends between alternate coils 31 and the other continuous strand 38 extends between the intermediate coils, so that each loop 35, 36 is overlapped by two other loops. Alternative constructions will be readily apparent to persons skilled in the art. For example the loops 35, 36 could extend between adjacent coils 31 or between every third, fourth or more coils 31 to provide shorter or longer loops than those shown in FIG. 7, if desired.

A variety of alternative edge guard means to those herein specifically proposed will, of course, readily present themselves to one skilled in the art and the invention is accordingly not to be considered as limited to the precise details of the embodiments described and illustrated.

Thus, for example, the use of barbs or equivalent formations as a means of facilitating continuing engagement of the edge guard means with the belt edge, whilst being convenient, is by no means essential, and alternative means, for example, resin impregnation, (as illustrated at 40 in FIG. 7), or sewing in the longitudinal direction of the belt, may be preferred in some instances. Alternatively, barbs or protruberances may be provided in the context of the embodiments not specifically said to include such formations and the disclosure hereof is to be construed accordingly, such additional retention as that arising from resin impregnation or sewing being adopted, or not, as preferred.

As regards that part of the guard means which contacts or is likely to contact any guide means or other wear creating structures, instead of providing a body part of synthetic plastics or equivalent materials, such body part may comprise bristle or like formations so disposed relative to the fabric edge as to define a cushion between such edge and any wear inducing structure during use of a link belt to which the guard means is applied.

We claim:

1. A link belt comprising a multiplicity of helical coils of a polymeric material arranged in interdigitated side-by-side relationship, and guard means comprising a flexible body part and mounting means therefor, the mounting means extending coaxially with and only partially into a coil of the belt and adapted to be retained therein, so as to locate the said body part in opposed disposition relative to and adjacent a belt edge defined by the respective, substantially aligned ends of the said multiplicity of coils so as to at least partially overlie said ends to protect the said edge against wear and/or damage.

2. A link belt having a guard means as claimed in claim 1, wherein the body part and mounting means comprise an integral structure.

3. A link belt having a guard means as claimed in claim 1 or 2 wherein the body part comprises an elongate element.

4. A link belt having a guard means as claimed in claim 2, wherein each body part has a plurality of mounting means associated therewith, each for engagement with a respective coil.

5. A link belt having a guard means as claimed in claim 2, wherein the mounting means includes an enlargement for cooperation with the interior of a coil to secure the mounting means against inadvertent withdrawal.

6. A link belt having a guard means as claimed in claim 1 comprising a continuous monofilament synthetic yarn, shaped to provide spaced aligned body parts separated by mounting means each for engagement with a respective helical coil.

7. A link belt comprising a multiplicity of helical coils arranged in interdigitated disposition, the edges of the belt being defined by respective substantially aligned ends of said multiplicity of helical coils, and edge guard means comprising a multiplicity of individual insert members engaged with selected ones of the said coils to extend outwardly therefrom and at least partially overlie the ends, thereby to protect said edges against wear, that part of successive insert members, in the longitudinal direction of the belt, which lies outwardly of the coil ends partially overlying the corresponding part of at least one adjacent insert member.

8. A link belt as claimed in claim 7, wherein each insert member has a coil engaging portion and an edge guard portion extending therefrom.

9. A link belt as claimed in claim 7, wherein each insert member includes an integral tail which, in use, lies substantially parallel to the respective edges of the belt.

10. A link belt as claimed in claim 7, wherein the guard means includes loops of strand material engaged with the said coils, each loop extending between the ends of two proximate coils outwardly of said belt and positioned to protect said ends against wear.

11. A link belt as claimed in claim 7, wherein each coil receives edge guard means into engagement therewith.

12. A link belt as claimed in claim 7, wherein the edge guard means extends throughout the full axial extent of the coil with which the same is engaged.

13. A link belt as claimed in claim 7, wherein the edge guard means includes protuberances thereon for location within the respective coils for retaining the means in position therein.

14. A link belt as claimed in claim 7, further including retention means adapted to secure the edge guard means in position relative to the belt edge.

15. A link belt as claimed in claim 14, wherein the edge regions of the belt are impregnated with a settable material so as to retain the edge guard means in engagement with the respective coils.

16. A link belt as claimed in claim 14, wherein the retention means includes a line of stitches extending through the belt and adapted to secure the edge guard means against inadvertent withdrawal from the belt edge.

17. A link belt comprising a multiplicity of helical coils arranged in interdigitated disposition, the edges of the belt being defined by respective substantially aligned ends of said multiplicity of helical coils, and edge guard means engaged with selected ones of the said coils to extend outwardly therefrom and at least partially overlie the ends, thereby to protect the said edges against wear, said edge guard means comprising a multiplicity of individual insert members engaged with selected ones of the said coils, each insert member including an integral tail which, in use, lies substantially parallel to the respective edge of the belt, said tail being flexible.

18. A link belt comprising a multiplicity of helical coils arranged in interdigitated disposition, the edges of the belt being defined by respective substantially aligned ends of said multiplicity of helical coils, and edge guard means engaged with selected ones of the said coils to extend outwardly therefrom and at least partially overlie the ends, thereby to protect the said edges against wear, said guard means including loops of strand material engaged with the said coils, each loop extending outwardly of said belt between and engaged with the ends of two non-adjacent coils and positioned to protect said ends against wear.

19. A link belt as claimed in claim 18, wherein each loop extending between non-adjacent coils overlaps at least one other loop.

20. A link belt as claimed in claim 18, wherein each coil receives edge guard means into engagement therewith.

21. A link belt as claimed in claim 18, further including retention means adapted to secure the edge guard means in position relative to the belt edge.

22. A link belt as claimed in claim 21, wherein the edge regions of the belt are impregnated with a settable material so as to retain the edge guard means in engagement with the respective coils.

23. A link belt as claimed in claim 21, wherein the retention means includes a line of stitches extending through the belt and adapted to secure the edge guard means against inadvertent withdrawal from the belt edge.

24. A link belt comprising a multiplicity of helical coils arranged in interdigitated disposition, the edges of the belt being defined by respective substantially aligned ends of said multiplicity of helical coils, and edge guard means engaged with selected ones of the said coils to extend outwardly therefrom and at least partially overlie the ends, thereby to protect the said edges against wear, said guard means including loops of strand material engaged with the said coils, each loop extending between the ends of two proximate coils outwardly of said belt and positioned to protect said ends against wear, said loops formed from a continuous length of strand material providing a multiplicity of loops in joined end-to-end disposition.

* * * * *